(12) United States Patent
Tamaki et al.

(10) Patent No.: US 6,407,321 B2
(45) Date of Patent: Jun. 18, 2002

(54) JIG FOR ALIGNING SHUTTER WITH PHOTO COUPLERS AND KEY AND ASSEMBLING METHOD USING THE SAME

(75) Inventors: Takashi Tamaki; Katsuo Itou, both of Shizuoka (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/754,780

(22) Filed: Jan. 4, 2001

(30) Foreign Application Priority Data

Jan. 6, 2000 (JP) ........................................ 2000-001080

(51) Int. Cl.[7] ................................................ G10F 1/02
(52) U.S. Cl. ...................... 84/20; 84/18; 84/27; 84/29; 84/434; 84/436
(58) Field of Search ................................ 84/18, 20, 25, 84/27, 29, 423 R, 424, 430, 433–437, 439, 719–720, 744–745

(56) References Cited

U.S. PATENT DOCUMENTS 5,552,559 A * 9/1996 Sugiyama et al. ............ 84/719
6,245,985 B1 * 6/2001 Sasaki et al. ............. 84/423 R

FOREIGN PATENT DOCUMENTS

| JP | 3-154097 | 7/1991 |
|---|---|---|
| JP | 3-161794 | 7/1991 |

* cited by examiner

Primary Examiner—Marlon T. Fletcher
(74) Attorney, Agent, or Firm—Dickstein, Shapiro, Morin & Oshinsky, L.L.P.

(57) ABSTRACT

A jig is used in an assemblage between key sensors and an acoustic piano, and the jig has a shutter guide assembled with a casing of optical sensor array for aligning slits with target trajectories of shutter plates and pieces of adhesive double coated tape adhered to the shutter plates for aligning the shutter plates with associated white/black keys, wherein the shutter plates are inserted into the slits so that the shutter plates are placed on the target trajectories, and the white/black keys are moved along the target trajectories until they are brought into contact with the pieces of adhesive double coated tape for temporality tacking the shutter plates to the associated white/black keys.

40 Claims, 6 Drawing Sheets

JIG FOR ALIGNING SHUTTER WITH PHOTO COUPLERS AND KEY AND ASSEMBLING METHOD USING THE SAME

FIELD OF THE INVENTION

This invention relates to a keyboard musical instrument equipped with key sensors and, more particularly, to a jig for aligning a shutter plate with a key and an assembling method using the jig.

DESCRIPTION OF THE RELATED ART

Various kinds of keyboard musical instrument are sold in the market. An automatic player piano is categorized in the keyboard musical instrument. The automatic player piano is an acoustic piano equipped with a playback system and a recording system. The playback system includes solenoid-operated key actuators and a controller. The solenoid-operated key actuators are provided on the key bed under the keyboard, and the controller sequentially energizes the solenoid-operated key actuators for moving the keys without fingering. The keys are moved as if a pianist plays a tune on the keyboard. On the other hand, the recording system includes a data processor and key sensors attached to the white keys and the black keys. While a pianist is fingering on the keyboard, the white/black keys are selectively moved for actuating associated action mechanisms. The action mechanisms give rise to rotation of hammers, and the hammers strike associated music strings. The key sensors are provided on the trajectories of the white/black keys, and notify the key motions to the data processor. The data processor analyzes the pieces of positional data information for the key velocity and timings, and produces music data codes representative of the performance on the keyboard.

A known key sensor is a combination of a shutter plate and photo-couplers. The shutter plate is attached to a lower surface of the associated white/black key, and downwardly projects therefrom. Thus, the shutter plate is movable together with the white/black key. On the other hand, the photo-couplers are provided on the key bed, and radiate light beams across the trajectory of the shutter plate. While a pianist is depressing the white/black key from the rest position toward the end position, the shutter plate sequentially interrupts the light beams. The photo-couplers notify the interruptions to the data processor. The data processor determines lapse of time from the initiation of the performance to the interruption of the light beam, and calculates the key velocity on the basis of the time period between the interruption of the upper light beam and the interruption of the lower light beam. Thus, the key sensors are important parts of the automatic player piano, and the manufacturer assembles the shutter plates and the photo-couplers with the keys and the key bed, respectively.

Conventionally, the shutter plates are manually attached to the white/black keys. If a shutter plate is offset from the target position, the shutter plate does not interrupt the light beams. For this reason, the assembling worker is expected to carefully assembly the shutter plates to the white/black keys. Such a careful work consumes a large amount of time and labor, and increases the production cost of the automatic player piano.

In order to speed up the assembling work, a jig is proposed in Japanese Patent Publication of Unexamined Application (laid-open) No. 3-154097. The prior art jig disclosed in the Japanese Patent Publication of Unexamined Application includes a spacer and an adhesive double coated tape. The photo-couplers are fixed to a cubic case, and a slit is formed in the cubic case. The cubic case is associated with one of the keys. Plural cubic cases are arrayed, and the case array is to be mounted on the key bed. The slit is open to the upper surface of each cubic case, and downwardly penetrates from the upper surface. A pair of photo-couplers is fixed inside the cubic case in such a manner as to radiate the light beams across the slit. The slit is wider than the shutter plate, and the shutter plate is insertable into the slit.

The prior art jig has a base plate to be placed on the upper surface of the cubic case and a vertical plate snugly received in the slit of the cubic case. A narrow slit is formed in the vertical plate, and is open to the upper surface of the base plate. The narrow slit is as wide as the shutter plate. The key sensor is assembled as follows. The array of cubic cases is mounted on the key bed, and the cubit cases are roughly aligned with the associated keys. The prior art jig is placed on one of the cubic cases, and the vertical plate is snugly inserted into the slit formed in the cubic case. The shutter plate is placed on the prior art jig, and is snugly received in the slit formed in the vertical plate. A piece of the adhesive double coated tape is adhered to the upper surface of the shutter plate. The associated key is downwardly moved, and the piece of double coated tape is adhered to the lower surface of the associated key. The shutter plate is fixed to the associated key by means of nails. The above-described assembling work is repeated for all the keys.

The prior art jig makes the shutter plate exactly aligned with the associated key, and permits the manufacturer to complete the assembling work speedy. However, the prior art jig is used for the alignment of each shutter plate with the associated key. This means that the manufacturer needs to move the prior art jig from one cubic case to another. For this reason, the assembling work still consumes a large amount of time and labor, and the production cost is not so widely reduced.

SUMMARY OF THE INVENTION

It is therefore an important object of the present invention to provide a jig, which concurrently aligns plural shutter plates with associated keys.

It is also an important object of the present invention to provide an assembling method using the jig.

In accordance with one aspect of the present invention, there is provided a jig for aligning plural shutter members with associated sensors and associated manipulators comprising a shutter guide formed with plural hollow spaces snugly receiving the shutter members, respectively, and having a positioning means for locating the plural hollow spaces at target positions with respect to the associated sensors, and temporal tacking means provided on the plural shutter members for temporality tacking the plural shutter members to the associated manipulators.

In accordance with another aspect of the present invention, there is provided a method for assembling a detector array and shutter members with a keyboard musical instrument having a stationary member and plural manipulators movable with respect to the stationary member comprising the steps of a) preparing a jig having a shutter guide and temporal tacking means, b) mounting the detector array on the stationary member, c) aligning the shutter members with the detectors of the array by using the shutter guide, d) temporality tacking the shutter members to the plural manipulators by using the temporal tacking means for aligning the shutter members with the plural manipulators, and e) fixing the shutter members to the plural manipulators, respectively.

BRIEF DESCRIPTION OF THE DRAWINGS

The features and advantages of the jig and the assembling method will be more clearly understood from the following description taken in conjunction with the accompanying drawings in which.

DESCRIPTION OF THE PREFERRED EMBODIMENTS

First Embodiment

Figure 1:
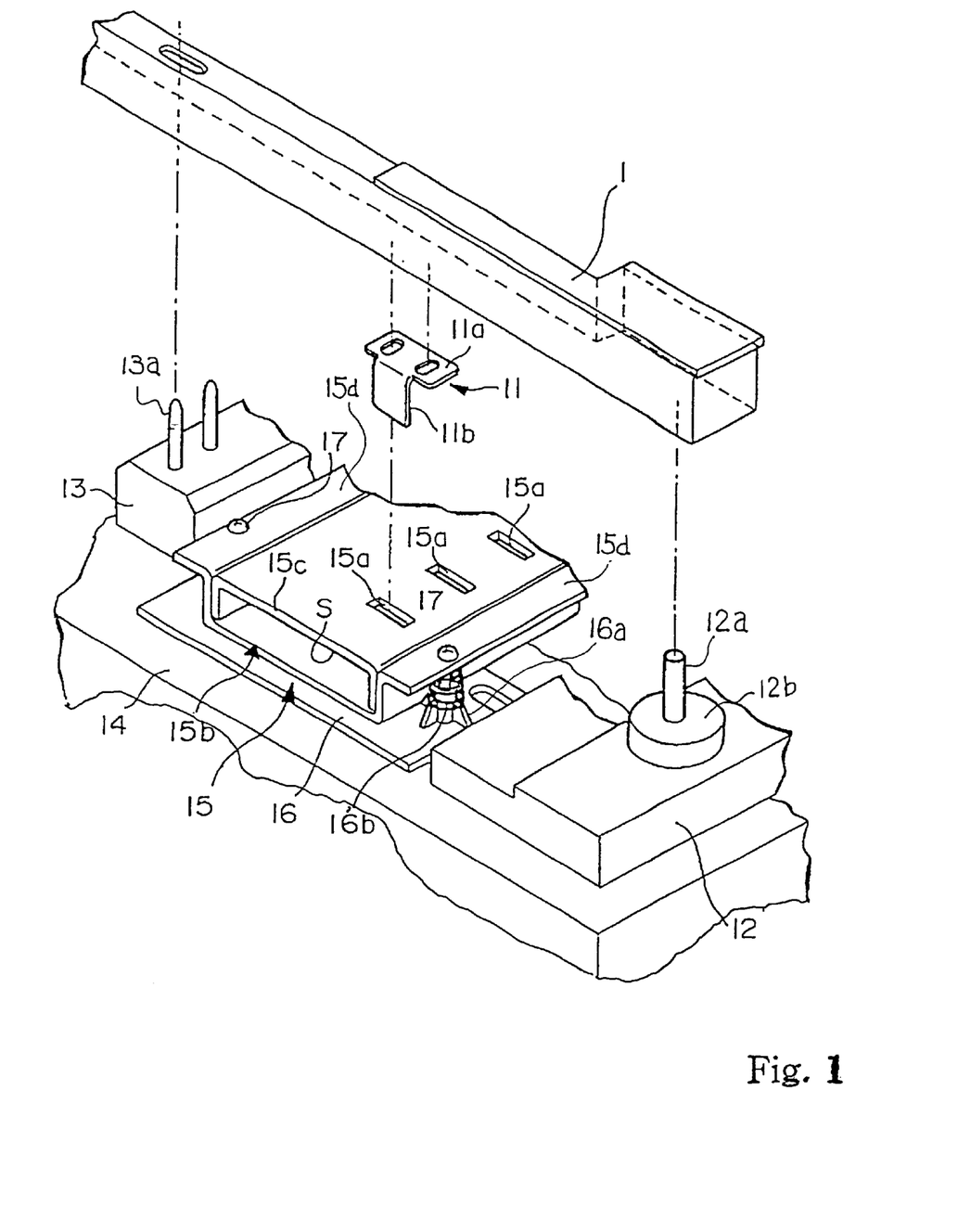
FIG. 1 is a perspective view showing a key sensor to which the present invention appertains.

Referring to FIG. 1 of the drawings, a white key 1 is lifted over a key bed 14. A front rail and a balance rail laterally extend on the key bend 14, and a gap takes place between the front rail 12 and the balance rail 13. The white key 1 forms a keyboard together with other white keys and black keys, and the keyboard is incorporated in an acoustic piano. Eighty-eight white/black keys 1 are lain on the well-known keyboard pattern. Key sensors are associated with the white/black keys 1, respectively, and plural shutter plates 11 and an optical sensor array 15 constitute the key sensors. Only one of the shutter plates 11 is shown in FIG. 1, and the optical sensor array 15 is shared between the plural shutter plates 11.

The shutter plate 11 is to be fixed to the lower surface of the white key 1, and the optical sensor array 15 is mounted on the key bed 14 between the front rail 12 and the balance rail 13. Though not shown in FIG. 1, a piece of adhesive double coated tape is to be inserted between the shutter plate 11 and the lower surface of the white key 1, and the shutter plate 11 is fixed to the white key 1 by means of U-letter shaped tacks.

The shutter plate 11 has a boss portion 11a and a tongue 11b. A pair of holes is formed in the boss portion 11a, and the holes are spaced from each other. The piece of adhesive double-coated tape is adhered to the boss portion 11a between the holes, and the U-letter shaped tacks are driven through the holes into the white key 1. The tongue 11b downwardly projects from the boss portion 11a, and is movable together with the associated white/black keys 11.

The optical sensor array 15 includes a casing and photo-couplers PC accommodated in the casing. Plural base plates 16 are fixed to the key bed 14, and are laterally spaced from one another at intervals. The casing laterally extends over the key bed 14, and is fixed to the plural base plates 16. The casing is as long as the keyboard, and the casing is shared between the shutter plates 11 attached to the white/black keys 11. A wide channel member 15b and a narrow channel member 15c are assembled in such a manner as to form a hollow space S therebetween.

Slits 15a are formed in the narrow channel member 15c at intervals equal to those of the shutter plates 11 attached to the white/black keys 11. The slits 15a are wider than the tongues 11b, and the tongues 11b are moved into and out of the hollow space S through the associated slits 15a. The photo-couplers are provided in the hollow space, and radiate light beams across the trajectories of the tongues 11b, respectively. Plural photo-couplers PC are arranged along the trajectory of each white/black key 11. While a white/black key 11 is being downwardly moved, the tongue 11b sequentially interrupts the light beams of the associated photo-couplers PC, and the photo-couplers PC notify the current position of the associated white/black key 11 to a data processor (not shown).

The wide channel member 15b has fins 15d sideward projecting from both sides, and pairs of holes are formed in the fins 15d. Pairs of spring brackets 16a upwardly project from the base plates 16. The spring brackets 16a of each pair are spaced apart from each other in the fore-and-aft direction, and the distance between the spring brackets 16a of each pair are equal to the distance between the holes of the associated pair. The spring bracket 16a has a column and delta wings. The delta wings are spread from an intermediate portion of the column to the base plate 16. A female screw is vertically tapped in the column. The wide channel member 15b is placed on the base plates 16, and the holes are aligned with the columns of the spring brackets 16a, respectively. Coil springs 16b are received by the spring brackets 16a, respectively. The delta wings space the coil springs 16b from the base plates 16, and cause the upper ends of the coil springs 16b to upwardly project from the columns. Bolts 17 respectively pass the holes, and are screwed into the columns of the spring brackets 16a. The fins 15d exert force on the coil springs 16b, and the coil springs 16b are compressed. A worker appropriate regulates the force exerted on each of the coil springs 16b so as to keep the upper surface of the casing 15b/15c spaced from the key bed 14 by a predetermined distance. Accordingly, the photo-couplers PC are adjusted to appropriate positions with respect to the shutter plates 11 in the rest positions. Even if the key sensors 11/15 are installed in an acoustic piano at user's home, the worker easily adjusts the photo-couplers PC to the appropriate positions.

FIGS. 2, 3, 4, 5 and 6 show a jig according to the present invention. The jig is used for alignment between shutter plates 11 and the optical sensor array 15 and between the shutter plates 11 and the associated white/black keys 1. The jig according to the present invention comprises a shutter guide 21/22 (see FIGS. 2 to 5) and pieces of adhesive double coated tape 30 (see FIG. 6). The shutter guide 21/22 has a generally rectangular shape, and is laterally elongated under the white/black keys 1. In this instance, the shutter guide 21/22 are divided into four sub-guides. Each of the sub-guides is used for twenty-two white/black keys 1, because a monolithic structure is too long to be handled by a worker.

Figure 2:
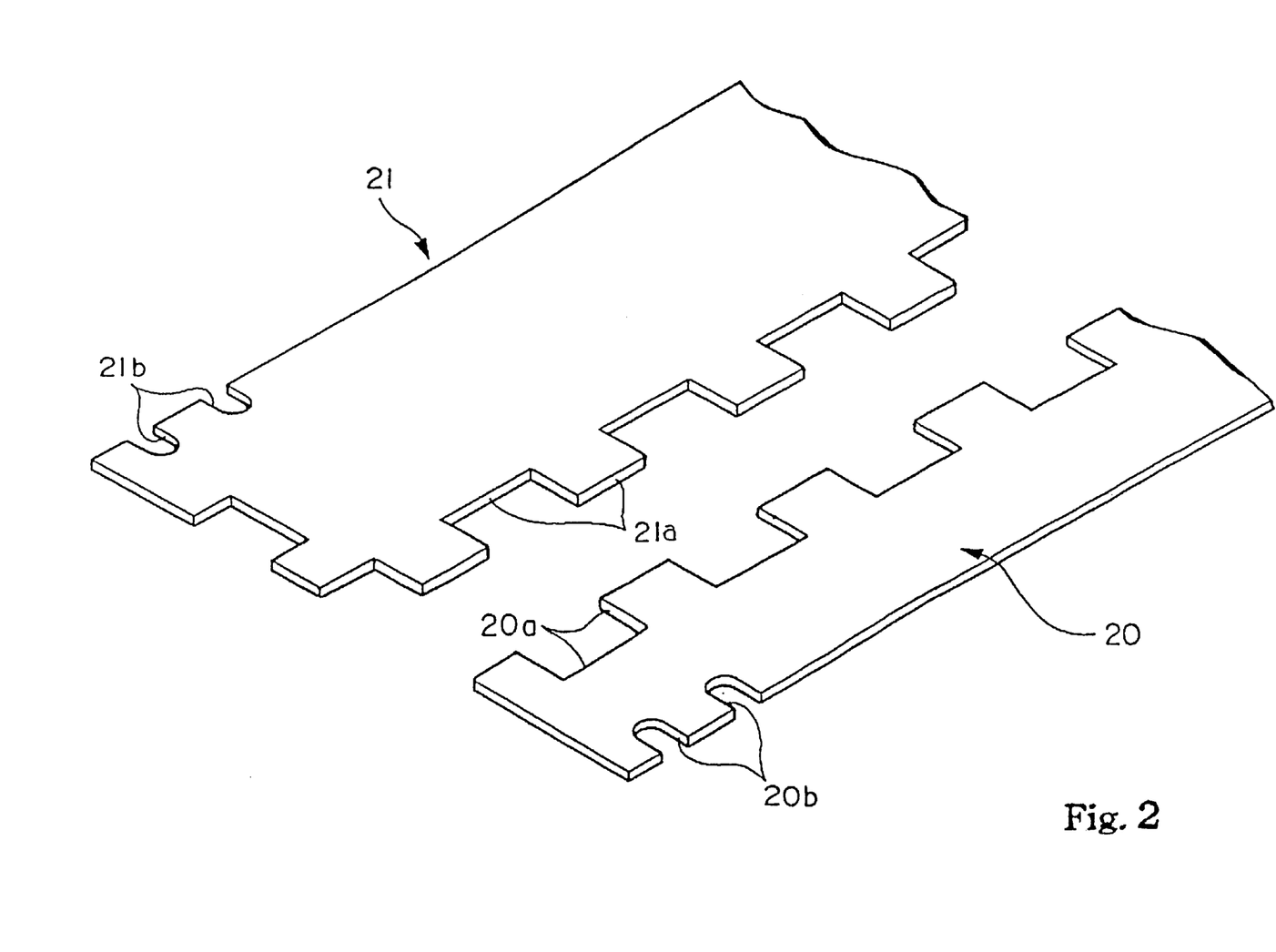
FIG. 2 is a perspective view showing a shutter guide split into two plates.
Figure 3:
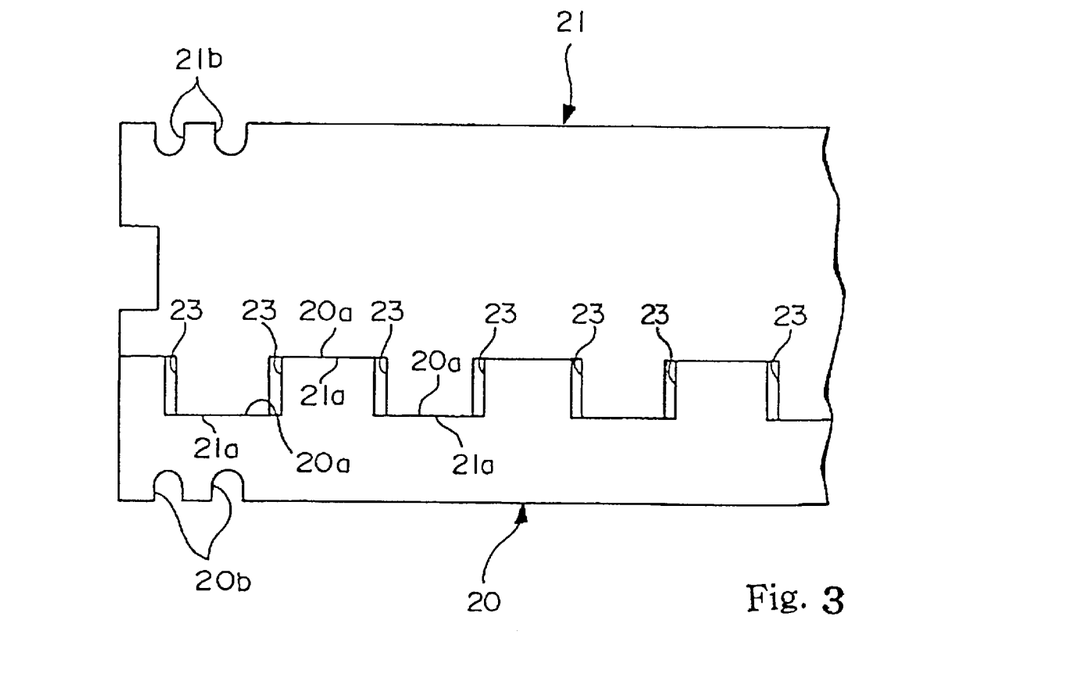
FIG. 3 is a plane view showing the two plates assembled together.

The shutter guide is split into two plates 21 and 22 (see FIG. 2). The plates 21/22 are, by way of example, formed from a sheet of cardboard. The cardboard is economical, and is easily recycled. The plate 20 has an inner edge 20a, which projects at intervals in such a manner as to form rectangular portions. Similarly, the other plate 21 has an inner edge 21a forming rectangular portions at intervals. Recesses take place between the rectangular portions of the plate 20, and the other plate 21 also has recesses between the rectangular portions. The rectangular portions of the plate 20 are to be interdigitated with the rectangular portions of the other plate 21. However, the recesses are wider than the rectangular portions. For this reason, when the plates 20 and 21 are assembled together, slits 23 are formed between the side edges of the rectangular portions of the plate 20 and the associated side edges of the rectangular portions of the other plate 21 as shown in FIG. 3. The slits 23 are narrower than the slits 15a (see FIG. 4), and are as narrow as the associated tongues 11b. The inner edges 20a/21a may be formed by using a punching machine. A Thomson die is available for the punching, and the Thomson die reduces the machining cost.

Semi-circular recesses 20b and 21b are further formed in the outer portions of the plates 20 and 21, and serve as indexing notches. The bolts 17 are snugly received in the semi-circular recesses 20b/21b, and cause the slits 23 to be nested in the slits 15a. Thus, the bolts 17 and the recesses 20b/21b align the slits 23 with the central portions of the slits 15a. When the tongues 11b of the shutter plates 11 are inserted into the slits 23, the tongues 11b are exactly aligned with the associated photo-couplers PC.

Figure 6:
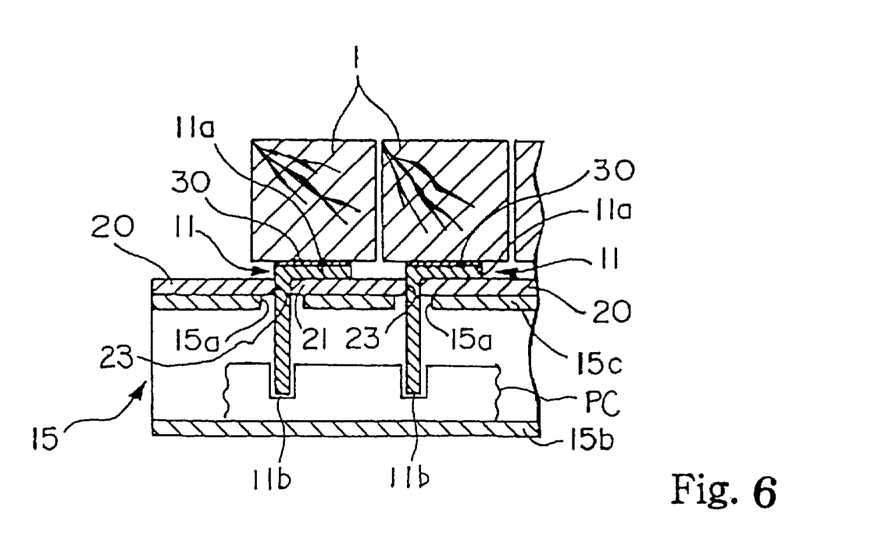
FIG. 6 is a cross sectional view showing white/black keys pressed against pieces of adhesive double-coated tape.

The pieces 30 of adhesive double coated tape are adhered between the upper surfaces of the boss portions 11a and the lower surfaces of the white/black keys 1, and temporality tack the shutter plates 11 to the white/black keys 1.

Using the jig according to the present invention, the key sensors 11/15 are assembled with the acoustic piano as follows. The acoustic piano is assumed to have been already placed at user's home. First, a worker lifts up the white/black keys 1 as shown in FIG. 1. The front rail 12 and the balance rail 13 are exposed to the worker, and the base plates 16 are fixed to the key bed 14 at intervals. The spring brackets 16a are upright on the base plates 16.

Subsequently, the coil springs 16b are put onto the columns of the spring brackets 16a, respectively. The narrow channel member 15c has been assembled with the wide channel member 15b on which the photo-couplers PC were installed. The optical sensor array 15 is put on the base plates 16, and the holes are aligned to the columns of the spring brackets 16b. The bolts 17 are inserted into the holes, and are engaged with the female screws of the columns. The bolts 17 are screwed into the spring brackets 16b against the elastic force of the coil springs 16b. The worker makes the upper surface of the narrow channel member 15c roughly parallel to the lower surfaces of the white/black keys 1 by regulating the force exerted on the coil springs 16b.

Figure 4:
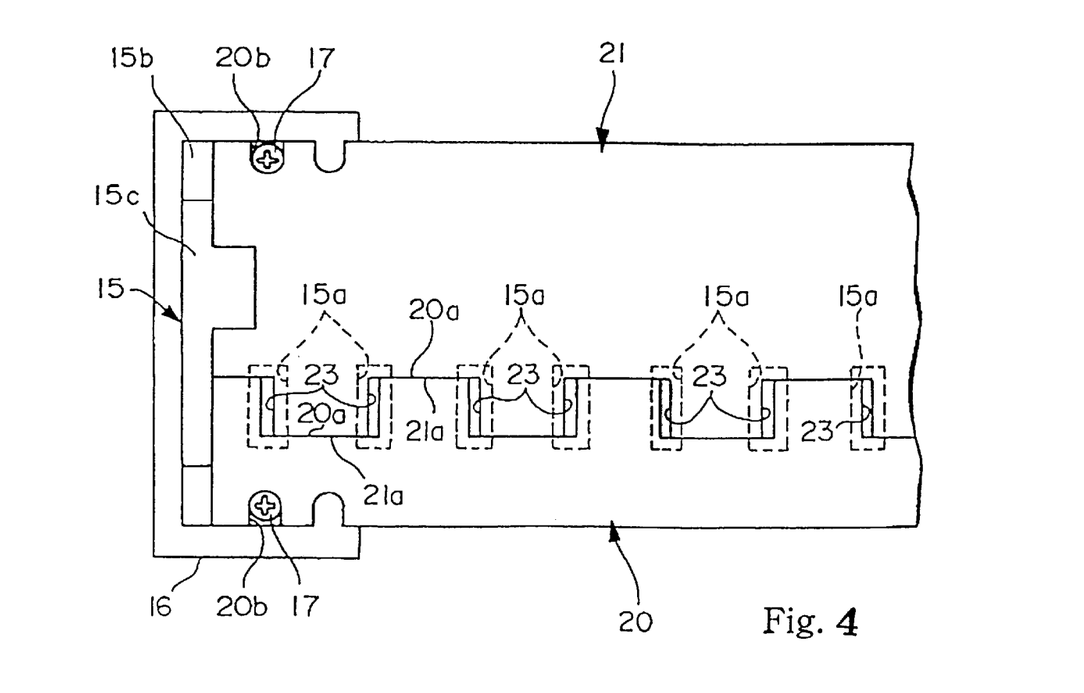
FIG. 4 is a plane view showing the shutter guide attached to a casing of an optical sensor array.
Figure 5:
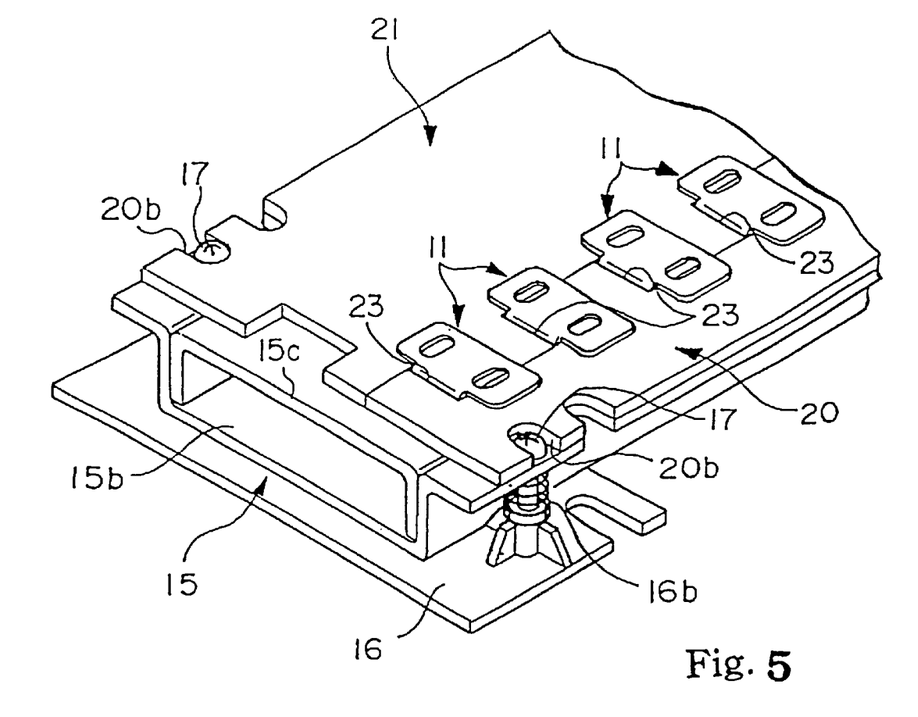
FIG. 5 is a perspective view showing the shutter guide attached to the casing.

Subsequently, the plates 20/21 are assembled together as shown in FIG. 3, and put on the optical sensor array 15. The shutter guide 20/21 is adjusted in such a manner that the stem portions of the bolts 17 are placed in the semi-circular recesses 20b/21b. The worker turns the bolts 17, and makes the shutter guide 20/21 parallel to the lower surfaces of the white/black keys 1. The bolt heads are pressed against the shutter guide 20/21. Then, the shutter guide 20/21 is fixed to the casing, and the slits 23 are properly nested in the slits 15a as shown in FIG. 4.

Subsequently, the tongues 11b is inserted into the slits 23, and the boss portions 11a are put on the shutter guide 20/21. The shutter plates 11 are aligned with the associated photo-couplers PC of the optical sensor array 15. The pieces of adhesive double coated tape 30 are put on the upper surfaces of the boss portions 11a. The white/black keys 1 are put on the balance rail 13, and balance pins 13a and front pins 12a are inserted into the associated white/black keys 1. The white/black keys 1 are inclined due to the self-weight, and the front end portions of the white/black keys 1 are spaced from front pin cloth punchings 12b.

Subsequently, the worker depresses the white/black keys 1, and are pressed against the pieces of adhesive double coated tape 30 as shown in FIG. 6. The shutter plates 11 are temporality tacked to the lower surfaces of the white/black keys 1 by means of the pieces of adhesive double coated tape 30. Thus, the shutter plates 11 are aligned with the associated white/black keys 1, respectively, without moving the shutter guide 20/21.

The worker disassembles the white/black keys 1 from the balance rail 13 and the front rail 12, and the shutter plates 11 are fixed to the white/black keys 1 by means of U-letter shaped tacks (not shown). The worker removes the shutter guide 20/21 from the optical sensor array 15, and regulates the bolts 17 so as to adjust the optical sensor array 15 to the predetermined height. Finally, the worker inserts the balance pins 13a and the front pins 12a into the white/black keys 1, again. The tongues 11b are aligned with the slits 15a, and the assemblage is completed.

In the first embodiment, the white/black keys 1 are corresponding to plural manipulators, and the bolts 17 and the semi-circular recesses 20b/21b as a whole constitute a positioning means. The slits 23 are equivalent to hollow spaces, and the pieces of adhesive double coated tape 30 serve as temporal tacking means. The optical sensor array 15 is corresponding to a detector array, and the key bed 14 serves as a stationary member.

As will be appreciated from the foregoing description, the plural slits 23 are formed in the shutter guide 20/21, and are simultaneously aligned with the slits 15a of the optical sensor array 15 when the shutter guide 20/21 is appropriately positioned on the casing 15b/15c of the optical sensor array 15. The tongues 11b are snugly received in the slits 23, and the shutter guide 20/21 permits the worker to align the shutter plates 11 with the associated photo couplers PC. The pieces of adhesive double coated tape 30 temporality tack the shutter plates 11 already aligned with the photo couplers PC to the associated white/black keys 1, and the shutter plates 11 are aligned with the associated white/black keys 1. The above-described aligning works are carried out without moving the shutter guide 20/21. Thus, the shutter guide 20/21 makes the assemblage simple and easy. This results in reduction of assembling cost.

Second Embodiment

Figure 7:
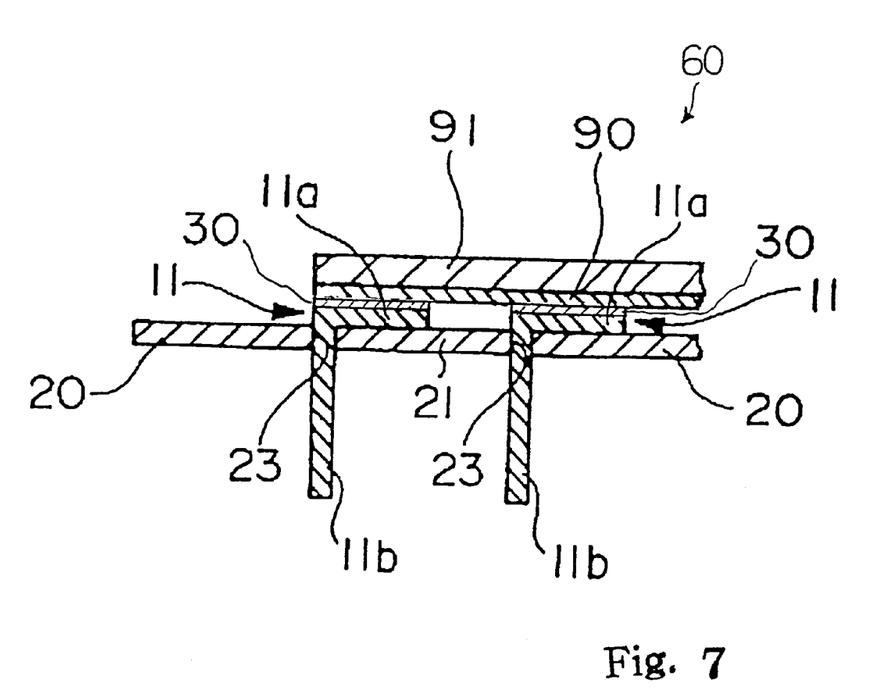
FIG. 7 is a cross sectional view showing another shutter guide according to the present invention.

FIG. 7 shows another jig 60 embodying the present invention. The jig 60 implementing the second embodiment comprises the shutter guide 20/21, the pieces of adhesive double coated tape 30, a separator 90 and a reinforcing plate 91. The shutter guide 20/21 and the pieces of adhesive double coated tape 30 are similar to those of the first embodiment, and no further description is incorporated hereinbelow.

The reinforcing plate 91 is formed of paper such as a sheet of cardboard. The separator 90 is provided between the reinforcing plate 91 and the pieces of adhesive double coated tape 30, and allows a worker to smoothly separate the pieces of adhesive double coated tape 30. The reinforcing plate 91 enhances the mechanical strength of the shutter guide 20/21, and prevents the shutter guide 20/21 from undesirable deformation during the conveyance of the jig 60.

The key sensors are installed in the acoustic piano as follows. The manufacturer assembles the plates 20/21 into the shutter guide, and inserts the shutter plates 11 into the slits 23. The pieces of adhesive double coated tape 30 are adhered to the boss portions 11a of the shutter plates 11, respectively, and the separator 90 is adhered to the reinforcing plate 91. The pieces of adhesive double coated tape 30 are adhered to the separator 90. Thus, the shutter plates 11 are sandwiched between the shutter guide 20/21 and the reinforcing plate 91 as shown in FIG. 7. The assemblage between the shutter plates 11 and the jig 60 is carried out in a factory of the manufacturer or a service station of a seller.

A worker conveys the optical sensor array 15 and the shutter plates 11 already assembled with the jig 60 to user's home. The worker lifts up the white/black keys 1 as shown in FIG. 1 The front rail 12 and the balance rail 13 are exposed to the worker, and the base plates 16 are fixed to the key bed 14 at intervals. The spring brackets 16a are upright on the base plates 16.

Subsequently, the coil springs 16b are put onto the columns of the spring brackets 16a, respectively. The optical sensor array 15 is put on the base plates 16, and the holes are aligned to the columns of the spring brackets 16b. The bolts 17 are inserted into the holes, and are engaged with the female screws of the columns. The bolts 17 are screwed into the spring brackets 16b against the elastic force of the coil springs 16b. The worker makes the upper surface of the narrow channel member 15c roughly in parallel to the lower surfaces of the white/black keys 1 by regulating the force exerted on the coil springs 16b.

Subsequently, the shutter guide 20/21 is put on the casing, and the semi-circular recesses 20b/21b are aligned with the stems of the bolts 17. The tongues 11b are inserted into the slits 15a, and are aligned with the photocouplers PC. The worker screws the bolts into the spring brackets 16a, and fixes the shutter guide 20/21 to the casing of the optical sensor array 15.

The white/black keys 1 are put on the balance rail 13, and balance pins 13a and front pins 12a are inserted into the associated white/black keys 1. The white/black keys 1 are inclined due to the self-weight, and the front end portions of the white/black keys 1 are spaced from front pin cloth punchings 12b.

Subsequently, the worker depresses the white/black keys 1. The lower surface of the white/black keys 1 are brought into contact with the upper surface of the reinforcing plate 91. The worker checks the white/black keys 1 to see whether or not gap takes place between the lower surfaces of the white/black keys 1 and the reinforcing plate 91. If the reinforcing plate 91 is inclined, the gap takes place. Then, the worker regulates the bolts 17 so as to make the lower surfaces of the white/black keys 1 in parallel to the upper surface of the reinforcing plate 91. Thus, the reinforcing plate 91 assists the worker in making the lower surfaces of the white/black keys 1 in parallel to the pieces of adhesive double coated tape 30 without adhesion to the white/black keys 1. The white/black keys 1 are removed from the center rail 13, again.

Subsequently, the worker separates the reinforcing plate 91 together with the separator 90 from the pieces of adhesive double coated tape 30. The white/black keys 1 are put on the center rail 13, and the worker presses the white/black keys 1 against the pieces of adhesive double coated tape 30. The shutter plates 11 are temporality tacked to the lower surfaces of the white/black keys 1 by means of the pieces of adhesive double coated tape 30. Thus, the shutter plates 11 are aligned with the associated white/black keys 1, respectively, without moving the shutter guide 20/21.

The worker disassembles the white/black keys 1 from the balance rail 13 and the front rail 12, and the shutter plates 11 are fixed to the white/black keys 1 by means of U-letter shaped tacks (not shown). The worker removes the shutter guide 20/21 from the optical sensor array 15, and regulates the bolts 17 so as to adjust the optical sensor array 15 to the predetermined height. Finally, the worker inserts the balance pins 13a and the front pins 12a into the white/black keys 1, again. The tongues 11b are aligned with the slits 15a, and the key sensors are installed in the acoustic piano.

As will be appreciated from the foregoing description, the jig 60 assists the worker in assembling the key sensors with the acoustic piano. The plural shutter plates 11 are simultaneously aligned with the associated photo couplers PC and, thereafter, with the associated white/black keys 1. Thus, the jig according to the present invention accelerates the assemblage between the optical sensor array and the shutter plates 11 and between the shutter plates 11 and the white/black keys 1. In the second embodiment, the shutter plates 11 are sandwiched between the shutter guide 20/21 and the reinforcing plate 91 in the factory or the service station. This results in speed-up of the assembling work at user's home.

Although particular embodiments of the present invention have been shown and described, it will be apparent to those skilled in the art that various changes and modifications may be made without departing from the spirit and scope of the present invention.

Figure 8:
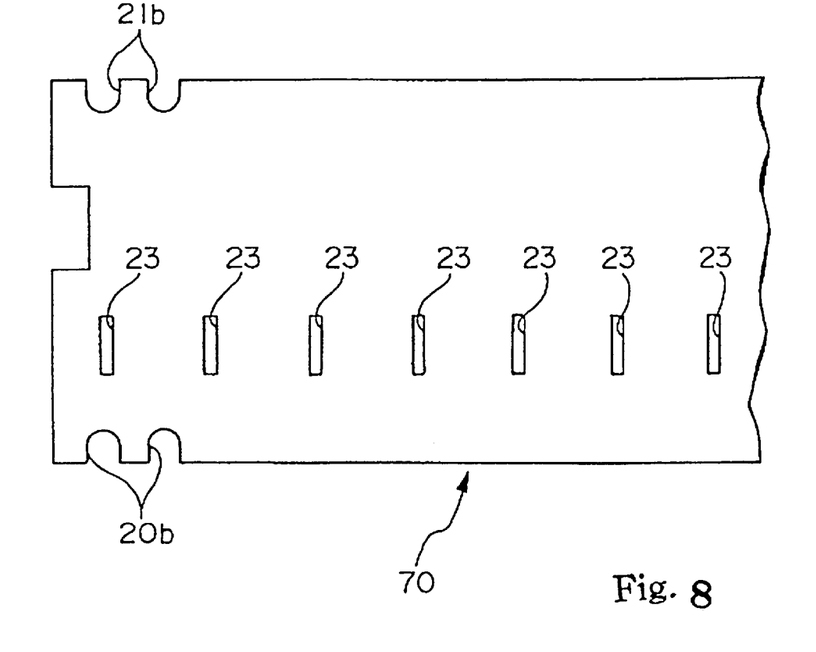
FIG. 8 is a plane view showing yet another shutter guide according to the present invention.

Yet another shutter guide 70 may be formed from a monolithic plate as shown in FIG. 8. The monolithic plate is formed from a sheet of cardboard, and slits 23 and semi-circular recesses 21b are formed in the monolithic plate. The slits 23 are equal in width to or less than 1 millimeter, and the tongues 11b are snugly received in the slits 23. The slits 23 and the semi-circular recesses 21b may be formed by using a punching machine. However, a machining cost is higher than that of the first embodiment, because the fine blanking requires a fine die.

Figure 9:
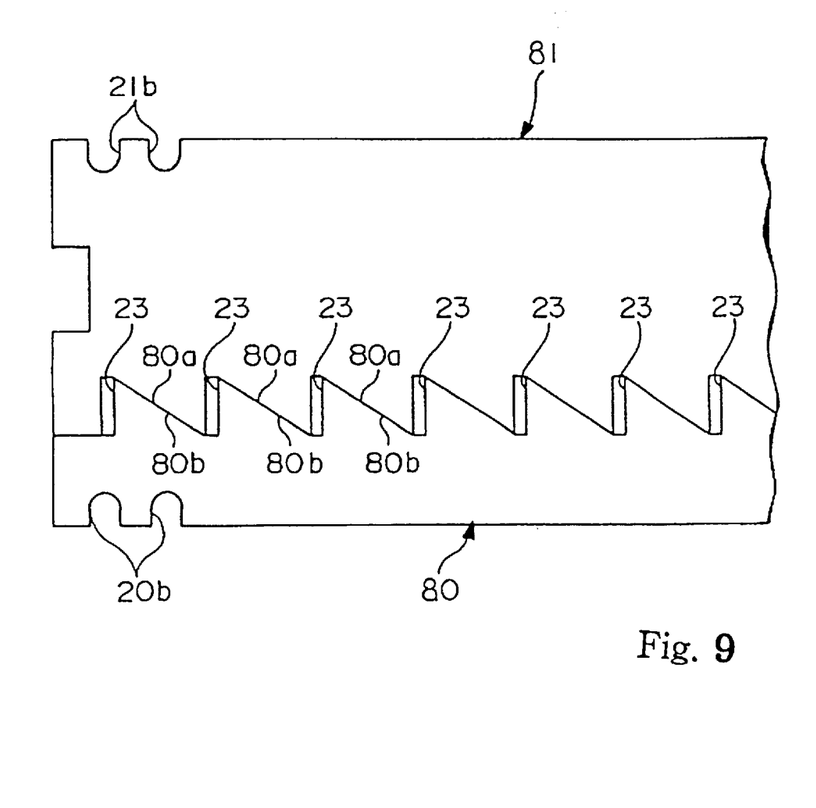
FIG. 9 is a plane view showing still another shutter plate according to the present invention.

Still another pair of plates 80/81 may form yet another shutter guide according to the present invention as shown in FIG. 9. The plates 80/81 respectively have inner edges 80a/80b like saw-tooth. For this reason, the inner edges 80a/80b form triangular projections. When the plates 80/81 are assembled, the triangular projections are slightly offset from each other, and form slits 23.

A casing may have projections which are to be inserted into holes formed in a shutter guide according to the present invention. In this instance, the bolts 17 are not used for the positioning.

The relative position between the semi-circular recesses 21b and the slits 23 is identical with the relative position between the bolts 17 and the slits 15a. For this reason, when the shutter guide 70 is fixed to the casing by means of the bolts 17, the slits 23 are aligned with the slits 15a. The shutter guide 70 is formed from the monolithic plate, and a worker can fix the shutter guide 70 to the casing without the assemblage.

The shutter guide 20/21, 60, 70 and 80 may be formed of any kind of material such as, for example, wood, metal, alloy or synthetic resin.

What is claimed is:

1. A jig for assembling plural shutter members with associated sensors and associated manipulators, comprising:

a shutter guide formed with plural hollow spaces snugly receiving said shutter members, respectively, and having a positioning means for locating said plural hollow spaces at target positions with respect to said associated sensors, said shutter guide including a pair of sheet members defining said hollow spaces at the boundary therebetween; and temporal tacking means provided on said plural shutter members for temporarily tacking said plural shutter members to said associated manipulators.

2. The jig as set forth in claim 1, in which said sheet members respectively have edges each periodically projecting so that said edges define said hollow spaces when said sheet members are assembled together.

3. The jig as set forth in claim 2, in which said edges form rectangular projections, and the leading ends of said rectangular projections formed in one of said sheet members are shorter than the distance between said rectangular projections formed in the other of said sheet members.

4. The jig as set forth in claim 2, in which said edges form right-angled triangular projections, and a base of each right-angled triangular projection is shorter than a distance between adjacent two of said right-angled triangular projections.

5. A jig for assembling plural shutter members with associated sensors and associated manipulators, comprising:

a shutter guide formed with plural hollow spaces snugly receiving said shutter members, respectively, and having a positioning means for locating said plural hollow spaces at target positions with respect to said associated sensors;

temporal tacking means provided on said plural shutter members for temporarily tacking said plural shutter members to said associated manipulators; and a reinforcing plate and a separator extending one surface of said reinforcing plate for smoothly separating said temporal tacking means on said plural shutter members from said reinforcing plate.

6. The jig as set forth in claim 5, in which said separator and said temporal tacking means on said plural shutter members are sandwiched between said reinforcing plate and said shutter guide so that said plural shutter members respectively projects through said hollow spaces.

7. A method for assembling a detector array and shutter members with a keyboard musical instrument having a stationary member and plural manipulators movable with respect to said stationary member, said method comprising:

a) preparing a jig having a shutter guide and temporal tacking means, said jig having a reinforcing plate and a separator sandwiched between said reinforcing plate and said shutter guide together with said temporal tacking members adhered to said shutter members partially projecting through hollow spaces formed in said shutter guide;

b) mounting said detector array on said stationary member;

c) aligning said shutter members with the detectors of said array by using said shutter guide;

d) temporarily tacking said shutter members to said plural manipulators by using said temporal tacking means for aligning said shutter members with said plural manipulators; and e) fixing said shutter members to said plural manipulators, respectively.

8. The method as set forth in claim 7, in which said step (c) includes the sub-steps of:

c-1) assembling said shutter guide with said detector array so as to locate hollow spaces formed in said shutter guide on target trajectories of said shutter members, and c-2) putting said shutter members on said shutter guide in such a manner as to cause parts of said shutter members to project through said hollow spaces, respectively.

9. The method as set forth in claim 7, in which said step d) includes the sub-steps of:

d-1) attaching said temporal tacking means to said shutter members put on said shutter guide in such a manner as to cause parts of said shutter members to project through hollow spaces formed in said shutter guide, and d-2) moving said plural manipulators along target trajectories so as to bring said plural manipulators into contact with said temporal tacking means, thereby temporarily tacking said shutter members to said plural manipulators, respectively.

10. The method as set forth in claim 7, in which said step c) includes the sub-steps of assembling said shutter guide with said detector array so as to locate said shutter members projecting through said hollow spaces on target trajectories of said shutter members.

11. The method as set forth in claim 7, in which said step d) includes the sub-steps of d-1) separating said separator adhered to said reinforcing member from said temporal tacking means so that said shutter members and said temporal tacking means are left on said shutter guide, and d-2) moving said plural manipulator along target trajectories so as to be brought into contact with said temporal tacking means.

12. A jig for assembling a plurality of shutter members, a plurality of manipulators and a plurality of sensors, said jig comprising:

a shutter guide having a plurality of openings, each of said openings snugly receiving an associated said shutter member and having a positioning member which locates said openings at target positions relative to said sensors; and temporary tacking means for temporarily adhering said shutter members to their associated manipulators so that said shutter members are movable with their associated manipulators.

13. The jig as set forth in claim 12, in which said associated manipulators are keys forming parts of a keyboard musical instrument.

14. The jig as set forth in claim 13, in which said keyboard musical instrument is an acoustic piano.

15. The jig as set forth in claim 12, further including positioning means for positioning said shutter guide relative to said optical sensors, said positioning means including stem portions of bolts and recesses formed in said shutter guide for receiving said stem portions.

16. The jig as set forth in claim 12, in which said shutter guide is formed of paper.

17. The jig as set forth in claim 16, wherein said paper is in the form of a sheet of cardboard.

18. The jig as set forth in claim 12, in which said temporary tacking means are pieces of adhesive compound coated on said shutter members, respectively.

19. The jig as set forth in claim 18, in which said pieces of adhesive compound are adhesive layers of sheets of adhesive double coated tape.

20. A jig for assembling a plurality of shutter members, a plurality of manipulators and a plurality of sensors, said jig comprising:

a shutter guide having a plurality of openings, each of said openings snugly receiving an associated said shutter member and having a positioning member which locates said openings at target positions relative to said sensors; and adhesive members for temporarily adhering said shutter members to their associated manipulators so that said shutter members are movable with their associated manipulators.

21. A combination comprising:

a plurality of manipulators;

a plurality of shutter member detecting optical sensors located in a housing, said housing having a plurality of housing openings;

a removable shutter guide having a plurality of shutter guide openings, each of said shutter guide openings being located at a corresponding one of said housing openings and being smaller than its corresponding housing opening; and a plurality of shutter members, each of said shutter members being associated with a respective said manipulator and extending through a respective one of said shutter guide openings and its corresponding housing opening; and said plurality of optical sensors being adapted to detect the presence of said shutter members extending through said housing openings.

22. The combination of claim 21, wherein said shutter members are releasably coupled to said manipulators.

23. The combination of claim 21, wherein said shutter members are adhesively coupled to said manipulators.

24. The combination of claim 21, wherein each of said shutter members is snugly fit within corresponding one of said shutter guide openings.

25. The combination of claim 21, wherein each of said optical sensors detects the presence of a corresponding one of said shutter members extending through its corresponding housing opening.

26. The combination of claim 21, wherein each of said shutter guide openings is located at the center of its corresponding housing opening.

27. The combination of claim 21, wherein said removable shutter guide is made of cardboard.

28. The combination of claim 21, further including means for aligning said removable shutter guide relative to said housing.

29. The combination of claim 21, wherein further including a recess formed in said removable shutter guide and a projection extending through said recess to align said removable shutter guide relative to said housing.

30. The combination of claim 29, wherein said projection is a bolt.

31. A The combination of claim 21, wherein said manipulators are part of a musical instrument.

32. A method for assembling shutter members with a keyboard musical instrument having a plurality of movable manipulators which move relative to an array of detectors, said method comprising:

aligning said shutter members with said detectors;

temporarily adhering said aligned shutter members to said movable manipulators; and thereafter permanently fixing said shutter members to said manipulators.

33. The method of claim 32, wherein said shutter members are aligned with said detectors using a shutter guide having a plurality of openings therein, said shutter members being placed in said openings so as to be aligned with said sensors.

34. The method of claim 33, wherein each of said shutter members extends through a corresponding said opening.

35. The method of claim 33, wherein said sensors are located in a sensor housing having a plurality of openings corresponding to the locations of said sensors and wherein said shutter guide openings are aligned with said sensor housing openings.

36. The method of claim 35, wherein said shutter guide is affixed to said keyboard musical instrument to align said shutter guide openings and said sensor housing openings.

37. The method of claim 32, wherein each of said shutter members is temporarily adhered to a corresponding said manipulator using an adhesive.

38. The method of claim 37, wherein said adhesive comprises an adhesive member.

39. The method of claim 32, wherein said manipulators move along respective pathways and wherein each of said manipulators is temporarily adhered to a corresponding one of said shutter members by moving it along its respective pathway into contact with said corresponding shutter member with an adhesive being located on at least one of said corresponding shutter member and manipulator.

40. A jig for assembling plural shutter members with associated manipulators respectively associated with sensors provided in the vicinity of extensions of trajectories of said associated manipulators, comprising:

a shutter guide formed with plural hollow spaces snugly receiving said shutter members, respectively, and having a positioning means for locating said plural hollow spaces at target positions with respect to said associated sensors; and temporary tacking means provided on said plural shutter members for temporarily tacking said plural shutter members to said associated manipulators so that said shutter members are movable together with said associated manipulators along said extensions.

* * * * *